(12) United States Patent
Tripathi

(10) Patent No.: US 7,937,404 B2
(45) Date of Patent: May 3, 2011

(54) DATA PROCESSING SYSTEM AND METHOD

(75) Inventor: Shailendra Tripathi, Hyderabad (IN)

(73) Assignee: Hewlett-Packard Development Company, L.P., Houston, TX (US)

(*) Notice: Subject to any disclaimer, the term of this patent is extended or adjusted under 35 U.S.C. 154(b) by 346 days.

(21) Appl. No.: 11/883,231

(22) PCT Filed: Feb. 4, 2005

(86) PCT No.: PCT/IN2005/000036
§ 371 (c)(1), (2), (4) Date: Jul. 27, 2007

(87) PCT Pub. No.: WO2006/082592
PCT Pub. Date: Aug. 10, 2006

(65) Prior Publication Data
US 2008/0140997 A1   Jun. 12, 2008

(51) Int. Cl.
G06F 7/00 (2006.01)
G06F 17/30 (2006.01)
(52) U.S. Cl. .................................. 707/770; 707/812
(58) Field of Classification Search ............... 707/1–10, 707/100–104.1, 200–206, 600–831; 711/100–103, 711/111, 151, 163
See application file for complete search history.

(56) References Cited

U.S. PATENT DOCUMENTS

| | | | |
|---|---|---|---|
| 5,887,151 A | 3/1999 | Raz et al. | |
| 6,032,216 A | 2/2000 | Schmuck et al. | |
| 2003/0229761 A1* | 12/2003 | Basu et al. | 711/134 |
| 2004/0267838 A1 | 12/2004 | Curran et al. | |

OTHER PUBLICATIONS

Wook-Shin Han et al., Prefetching based on the type-level access pattern in object-relational DBMSs, 2001, IEEE, 651-660.*
Ke Zhou et al., Cache prefetching adaptive policy based on access pattern, 2002, IEEE, vol. 1, 496-500.*
Doshi et al., A strategy selection framework for adaptive prefetching in data visualization, 2003, IEEE, 107-116.*
Patterson, Hugo R., et al., "Informed Prefetching ad Caching", In Proceedings of the 15th Symposium on Operating System Principles, (1995), 79-95.
Pasquale, Barbara K., et al., "A Static Analysis of I/O Characteristics of Scientific Applications in a Production Workload", In Proceedings of Supercomputing '93, (1993), 388-397.
O'Neil, Elizabeth J., et al., "The LRU-K Page Replacement Algorithm For Database Disk Buffering", In Proceedings of the 1993 ACM SIGMOD Conference, (1993), 297-306.

(Continued)

Primary Examiner — Jean B Fleurantin

(57) ABSTRACT

A data processing system and method uses metadata associated with data to be retrieved from storage to identify further data to be retrieve at least a portion of that further data from the storage in accordance with a prefetch policy. A first interface receives a data access request from an application, and a prefetcher reads metadata associated with a file and uses the metadata to identify further data to be prefetched and placed in storage or memory having a performance greater than the performance of persistent storage.

19 Claims, 3 Drawing Sheets

OTHER PUBLICATIONS

Mowry, Todd C., et al., "Automatic Compiler-inserted I/O Prefetching for Out-of-core Applications", *In Proceedings of the Second USENIX Symposium on Operating Systems Design and Implementation*, (1996), 3-17.

Lee, Donghee et al., "On the Existence of a Spectrum of Policies That Subsumes the Least Recently Used (LRU) and Least Frequently Used (LFU) Policies", *In Proceedings of the 1999 ACM SIGMETRICS Conference*, (1999), 134-143.

Griffioen, James et al., "Reducing File System Latency Using a Predictive Approach", *In Proceedings of the 1994 Summer USENIX Conference*, (1994), 11 pgs.

Glass, Gideon et al., "Adaptive Page Replacement Based on Memory Reference Behavior" *In Proceedings of the 1997 ACM SIGMETRICS Conference*, (1997), 115-126.

Choi, Jongmoo et al., "Towards Application/File-level Characterization of Block References: A Case for Fine-Grained Buffer Management", *ACM SIGMETRICS*, (2000), 286-295.

Choi, Jongmoo et al., "An Implementation Study of a Detection-Based Adaptive Block Replacement Scheme", *In Proceedings of the 1999 Annual USENIX Conference*, (1999), 14 pgs.

Cao, Pei et al., "Implementation and Performance of Integrated Application-Controlled File Caching, Prefetching, and Disk Scheduling", *In Proceedings of the 1st USENIX Symposium on Operating Systems Design and Implementation*, (1996), 311-343.

Baker, Mary G., et al., "Measurements of a Distributed File System", *In Proceedings of the 13th Symposium on Operating System Principles*, (1991), 198-212.

\* cited by examiner

DATA PROCESSING SYSTEM AND METHOD

FIELD OF THE INVENTION

The present invention relates to a data processing system and method and, more particularly, to a file system and method.

BACKGROUND TO THE INVENTION

It is well understood that disc access times have not developed at the same rate as the CPU speeds and, accordingly, the difference in performance results in disc input/output operations being a bottleneck in the overall performance of computers. Two main techniques have been developed within the art to mitigate the effect of this performance gap. These two techniques are caching and prefetching. Caching involves maintaining data in memory that is most likely to be used again within a relatively short period of time. Prefetching involves reading data into memory in advance, and in anticipation, of it being used. Both techniques are widely used at the block level. Also, access patterns relating to relatively recent accesses can be used to influence future caching and prefetching of entire files.

Referring to FIG. 1, there is shown a computer system 100 comprising a file system 102 for servicing an application, i.e., dealing with data read/write disc operations associated with that application 104. When performing disc operations, the application 104 requests files from a disc drive 106 without regard to the size of those files, that is, arbitrarily large amounts of data can be requested by an application from a disc drive 106 or physical disc 118. To process such an application-level request, the file system 102 of an operating system 108 typically divides the request into a number of block size and block aligned requests.

The file system 102, when servicing the application-level request, will determine whether or not a block corresponding to one of the file system block requests is resident in an operating system cache memory 110. If the requested block is resident in the operating system cache memory 110, and it is valid, that block is retrieved and forwarded to the application 104. If the requested block is not resident in memory 110, the file system 102 issues a block request to a disc device driver 112 of the disc drive 106. The disc device driver 112 forwards the request to a disc controller 114 of the disc drive 106. The controller 114 determines whether or not the requested block is validly stored in a disc cache 116. If so, the block is retrieved from the cache 116 and forwarded to the application 104. If not, the disc controller 114 retrieves the requested block from a physical disc 118 of the disc drive 106.

It will be appreciated that prefetching files or blocks may be performed at the same time as fetching a block or file, that is, data, requested by the application 104. Therefore, the file system 102 may prefetch, for example, one block or more than one subsequent block from the disc drive 106 in anticipation of that subsequent block or those blocks being used by the application. The amount of data the file system 102 prefetches is determined by the file system's prefetch policy and may also be related to both a current of file offset and whether or not the application has been accessing data sequentially, for example. It will be appreciated that a read operation in relation to a block x from a file is sequential if the last block operation from that file was in relation to block x−1. It can be appreciated that such sequential operations represent a form of a sequential file access pattern.

One skilled in the art appreciates that file system accesses are typically pattern based and are such that the patterns can be classified as being sequential patterns, looping patterns, temporarily-clustered patterns and probabilistic reference patterns. Knowledge of such file access patterns is useful in designing a prefetch policy to improve overall performance of disc operations and, in particular, read operations.

However, each access pattern and any policy designed based on that access pattern has advantages and disadvantages. Furthermore, buffer replacement can also influence the overall performance of the computer. Still further, while some file prefetch policies are dynamic, the same policy is imposed on all files regardless of the individual requirements of a file.

It is an object of embodiments of the present invention to at least mitigate some of the problems of the prior art.

SUMMARY OF INVENTION

Accordingly, there is provided a file system comprising a first interface for receiving a file access request from an executable entity, like, for example, an application or program, and a second interface to perform an operation in relation to a unit of data stored on persistent storage, the file system comprising a prefetcher to read metadata associated with the file or unit of data and to use the metadata to identify prefetch data to be pretched and to store the prefetched data in memory.

Advantageously, the metadata allows a file prefetch policy to be realised that is tailored to individual files rather than being universally applicable regardless of the requirements or structure of the data constituting the file or other unit of data stored on the storage medium.

Furthermore, embodiments may allow a reduction in cache misses to be realised.

Embodiments advantageously aim to improve overall system performance by maintaining and using, for example, intra-file access patterns to identify units of data such as, for example, blocks of a disc or clusters, to be prefetched and stored in a cache.

Embodiments provide a data processing system comprising a first interface for receiving a data access request from an application and a further interface for performing an operation in relation to data stored on persistent or a nonvolatile, random access, storage medium, and a prefetcher to read metadata associated with the data and to use the metadata in identifying further data to be pretched and placed in storage or memory having a performance that is greater than the performance of the nonvolatile random access storage medium.

Embodiments provide a data processing system in which the metadata comprises data to identify or associated with at least one access pattern for the file or unit of data.

Embodiments provide a data processing system in which the metadata comprises data to identify or associated with a plurality of access patterns.

Embodiments provide a data processing system further comprising a correlator to determine a least one degree of similarity between the metadata and historical data access data.

Embodiments provide a data processing system compri lead that sing a selector to select at least some of the metadata for use in prefetching the further data. Embodiments are provided in which the at least some of the metadata is used to prefetch the further data according to the at least one determined degree of similarity.

Embodiments are provided in which the metadata comprises data identifying or associated with at least one of a sequential, a looping, a temporally-clustered or a probabilistic access pattern.

Embodiments provide a data processing system in which the metadata is stored within a predetermined data structure. Embodiments are provided in which the predetermined data structure is a unique identifier data structure. Embodiments are provided in which the data structure is an inode.

Embodiments provide a data processing system to prefetch data from storage in advance of an executable entity requesting the data, the system comprising means to select at least one access pattern associated with a request for data from the storage and means to prefetch further data from the storage according to the at least one access pattern and means to store the prefetched data.

Embodiments provide a data processing method to retrieve data from storage in response to a program requesting different data; the method comprising the steps of processing metadata associated with the different data to identify data to be retrieved from the storage; and retrieving the identified data from the storage.

Embodiments provides a method to prefetch data from storage, the method comprising the steps of receiving, from an application, a request to access a file; processing the request to identify a unit of data associated with the request; processing metadata associated with the request to access the file to identify at least one further unit of data; retrieving at least one of the unit of data associated with the request and the at least one further unit of data from the storage; servicing the request to access the file by forwarding at least a portion of the unit of data associated with the request; and storing at least a portion of the at least one further unit of data in a memory. One skilled in the art appreciated that the order of the above method can be changed without departing substantially from the overall effect. For example, the data specifically requested from storage to service the application-level request can be retrieved independently of any data to be prefetched.

Embodiments provide a computer program comprising computer executable code to process a data access request from an executable entity and to perform an operation in relation to data stored using a storage medium, and computer executable code to read metadata associated with the stored data and to use the metadata to identify further data to be prefetched and stored using further storage having a performance that is greater than the performance of the storage medium.

Embodiments provide a program comprising code to implement a system or method as described or claimed herein. Embodiments provide a product comprising readable storage storing such a program. It will be appreciated that the storage may take the form of a magnetic or optically readable medium such as a disc or tape or a device such as memory like, for example, RAM or flash memory or any other memory arrangement.

Embodiments of the present invention relate to a data processing system and method for using metadata associated with data to be retrieved from storage to identify further data to be retrieve at least a portion of that further data from the storage in accordance with a prefetch policy.

BRIEF DESCRIPTION OF THE DRAWINGS

Embodiments of the present invention will now be described, by way of example only, with reference to the accompanying drawings in which.

DETAILED DESCRIPTION OF EMBODIMENTS

Figure 1:
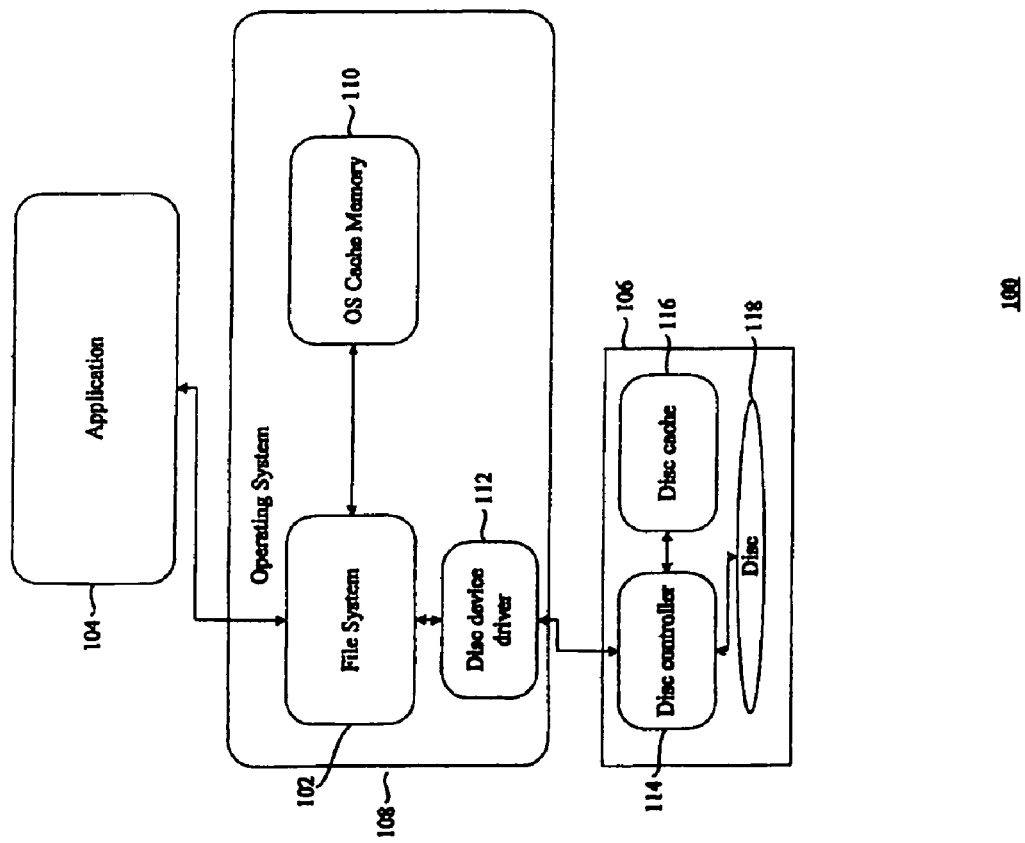
FIG. 1 shows a computer system, having a file system, for executing an application.
Figure 2:
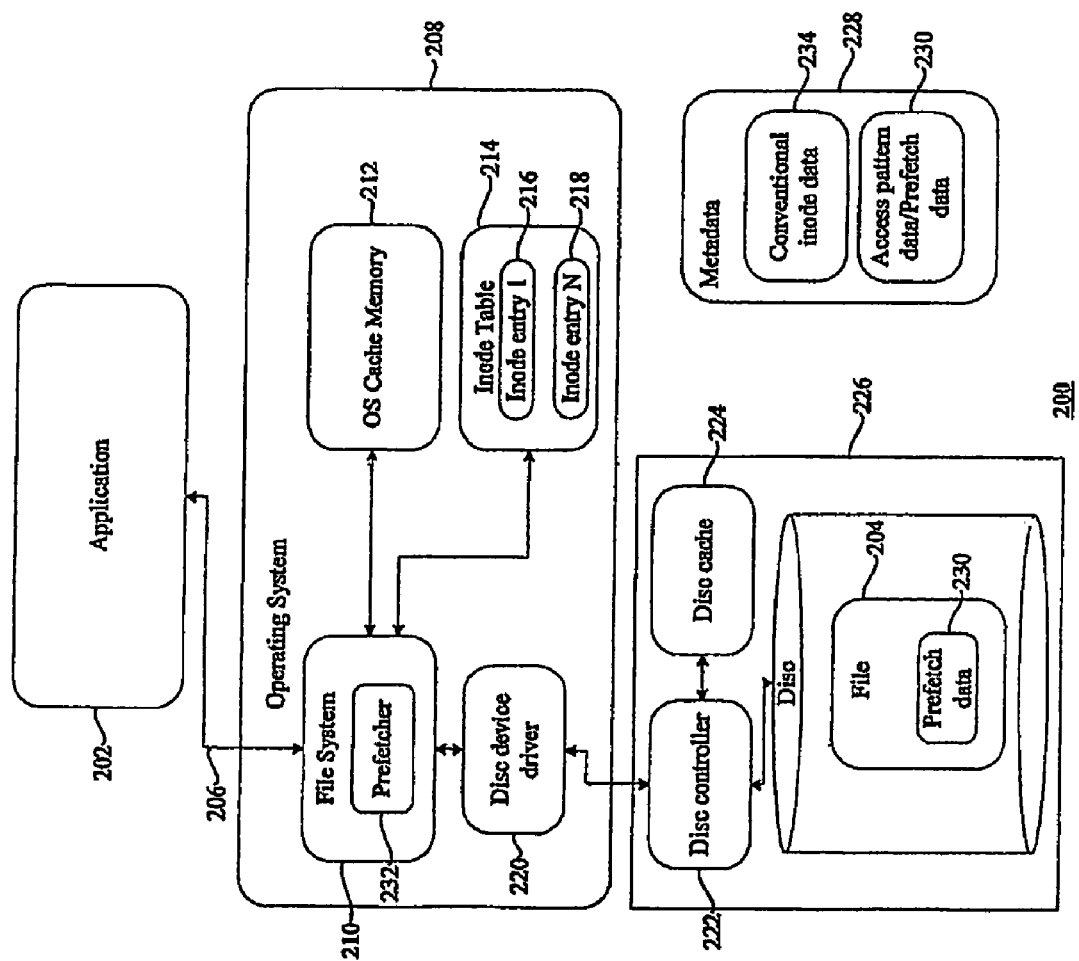
FIG. 2 shows a computer system, having a file system, according to an embodiment.

Referring to FIG. 2, there is shown a computer system 200 arranged to execute an application 202. When the application 202 requires access to a file 204, it issues an application-level file access request 206 to an operating system 208. A file system 210 of the operating system 208 is arranged to service the application-level access request 206. The file system 210 determines whether or not the application-level file access request 206 can be serviced from blocks of data (not shown) stored within an operating system cache memory 212. If the application-level file access request 206 can be serviced using data stored within the operating system cache memory 212, the appropriate data are retrieved from the operating system cache memory 212 and forwarded to the application 202 by the file system 210. It will be appreciated that a file or a block are embodiments of units of data or merely data and references to file, block, data and units of data are considered, in some contexts, to be synonymous and are used interchangeably.

However, if the application-level file access request 206 cannot be serviced from the operating system cache memory 212, the file system 210 accesses an inode table 214 to retrieve an inode entry corresponding to the application-level file access request 206. Typically, the inode table 214 will comprise a number of inode entries such as, for example, first 216 and Nth 218 inode entries. The file system 210 issues an access request, using the metadata contained within the retrieved inode entry, to a disc device driver 220. The disc device driver 220 issues a corresponding disc access request to a disc controller 222. The disc controller 222 attempts to retrieve a block or blocks associated with the disc access request from a disc cache 224. If the requested block or blocks is or are present within the disc cache 224, it is or they are retrieved and returned to the file system 210 via the disc controller 222 and the disc device driver 220. If a disc cache miss occurs, the disc controller 222 reads the relevant block or blocks from the hard disc drive (HDD) 226 and returns the read block or blocks to the file system 210 a via the disc device driver 220. The file system 210 forwards the retrieved data to the application 202. The file system may also cache the retrieved data in the operating system cache memory 212.

FIG. 2 also illustrates an example of the metadata 228, that is, an inode entry, associated with the file 204 or any other unit of data. It can be appreciated that the metadata 228 comprises access pattern data or prefetch data 230. The prefetch data 230 can take the form of a prefetch attribute record. The prefetch attribute record 230 comprises data representing or associated with an access pattern such as, for example, a file or block access pattern or an access pattern relating to any other unit of data. Embodiments can be realised in which the prefetch attribute record 230 comprises data representing or associated with a number of such access patterns. The file system 210 also comprises a prefetcher 232. The prefetcher 232 uses the prefetch data 230 to implement, or at least attempt to influence the operation of, a data prefetch policy such as a file or block prefetch policy or a prefetch policy relating to any other unit of data. The prefetch policy is arranged to read data from the nonvolatile storage medium such as the HDD 226 in advance of an anticipated need for that data by the application 202. The prefetcher 232 reads the prefetch attribute record 230 to determine the access pattern represented by the data contained within the prefetch attribute record 230. The prefetcher 232 uses any such an access pattern to retrieve files or blocks from the HDD 226.

It will be appreciated that a copy of the prefetch data 230 can also be stored with the file 204. Embodiments of the present invention have been described with reference to prefetch data being stored with an associated file. However, embodiments can be realised in which the prefetch data is stored separately from the file but nevertheless remain associated with the file or can be stored in any other way but remaining associated with the file.

As mentioned above, the prefetch data 230 may comprise or represent data associated with a number of access patterns. In such circumstances, the prefetcher 232 can use any access pattern selected from the number of access patterns in implementing the prefetch policy. The access pattern selected from the number of access patterns to be used in implementing the prefetch policy can be determined by applying an appropriate criterion or condition. For example, the prefetch attribute record can be read the first time the file is accessed and the prefetcher 232 can be arranged to determine whether or not there is a predetermined correlation between historical data access and one or more of the access patterns stored within, or accessible via, the prefetch attribute record. If the prefetcher 232 determines that there is a sufficient correlation between historical data access and one of the access patterns, that access pattern is selected as the basis for implementing or influencing the prefetch policy. If the prefetcher 232 determines that there is a sufficient correlation between historical data access and a number of the access patterns, the access pattern having the highest degree of correlation with the historical file or block access data is selected as the basis for implementing or influencing the prefetch policy. It will be appreciated that the code that performs the selection of the access data represents an embodiment of a selector.

If the prefetch attribute record 230 comprises a list of block identifiers (not shown) that are typically accessed according to the order of the list, when the file system 210 issues a request to the disc device driver 220 for a particular block, the prefetcher 232 identifies at least the next block identifier, or a further block identifier, in the list of block identifiers and instructs the disc device driver 220 to retrieve the identified block. Embodiments can be realised in which the prefetcher 232 retrieves a number of block identifiers from the list of block identifiers in response to the file system 210 issuing, or preparing to issue, the block request (not shown) to the disc device driver 220. It will be appreciated that the request issued by the file system 210 to the disc device driver 220 can comprise an indication of the specific block needed by the file system 210 to service the application 202 and the block or blocks identified by the prefetcher 232. Embodiment can be realised in which the request issued by the file system 210 to service the needs of the application 202 is sent to the disc device driver 220 independently of a request for the block or blocks identified by the prefetcher 232. Once the data specifically requested by the file system 210 has been retrieved, the prefetcher 232 can be arranged to issue a request for the block or blocks it identified to the disc device driver 220 and to store any subsequently retrieved data in anticipation of it being required by the application. It will be appreciated that this arrangement has the advantage that the data needed to service the application 202 is retrieved as quickly as possible and is not slowed down by retrieving data associated with the prefetch policy.

Embodiments can be realised in which the amount of data or the number of blocks requested by the prefetcher 232 is influenced by prevailing parameters within the computer such as, for example, the amount of free memory within the operating system cache memory 212 or any other parameter or aspect of the computer system. Although embodiments have been described with reference to data being cached within the operating system cache memory in anticipation of being used by the application, embodiments are not limited to such an arrangement. Embodiments can be realised in which the prefetched data is stored in some other manner.

It will be appreciated that the metadata 228 shown in FIG. 2 is also illustrated as comprising optional conventional metadata 234. The conventional metadata 234 comprises typical inode information such as, for example within a typical Unix file system context, fields relating to a device identifier for identifying the device holding the file or whatever is represented by the inode, an inode number, a mode indication describing what the inode represents as well as any associated access rights, use identifiers, a times field identifying the creation, modification and write times associated with the file or inode, a block size field providing an indication of the size of a block of the file in bytes, and inode operations field containing a pointer to a block of routine addresses, which routines are specific to the underlying file system and which perform operations in relation to the inode, a count field providing an indication of the number of system components currently using the inode, a lock field that is used to lock the inode when, for example, it is being read by the file system, a dirty field to provide an indication that the inode has been written to and that the underlying file system will need modifying and a file system specific information field.

Figure 3:
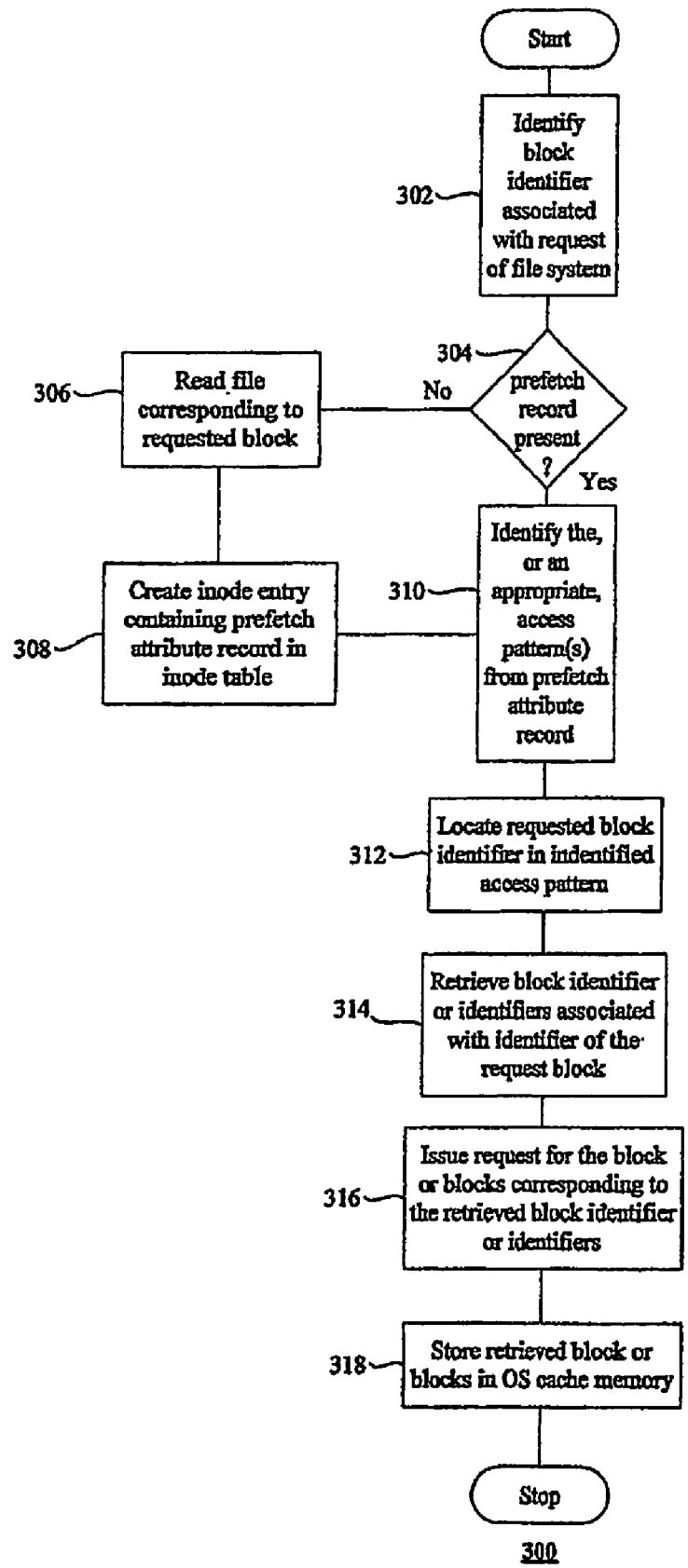
FIG. 3 depicts a flowchart of processing performed by an embodiment.

FIG. 3 shows a flow chart 300 of processing according to embodiments of the present invention. An identifier associated with the block of a file requested by the file system to service an application-level file system request issued by the application 202 is identified at step 302. A determination is made, at step 304, as to whether or not the inode table 214 contains an inode having a prefetch record 230 associated with the block identifier determined in step 302. If the determination at step 304 is such that a prefetch attribute record 230 is not stored within the inode table, the file corresponding to the requested block is read, at step 306, for the first time from the HDD 226. An inode entry containing the prefetch attribute record 230 is created in the inode table 214 in response to retrieving the file containing the requested block. The prefetch attribute record can be created independently by an application like a compiler or any other tool/application which is designed to detect the file access pattern. Thereafter, processing resumes at step 310 as it does if the determination at step 304 is positive.

An appropriate or the access pattern corresponding to the block identifier determined in step 302 is identified at step 310. At step 312, the block identifier associated with the request for the block required to service the application-level file request is identified within the identified access pattern. A block identifier or block identifiers associated with the block identifier of the block required to service the application-level file request is or are identified from the access pattern at step 314. In accordance with a prefetch policy, the block or blocks thus identified from the access pattern at step 314 is or are retrieved from the HDD 226 at step 316. The retrieved block or blocks is or are stored in the operating system cache memory 212 in anticipation of being requested by the application 202.

Embodiments of the present invention have been described with reference to prefetch data being stored with an associated file. However, embodiments can be realised in which the prefetch data is stored separately from the file but nevertheless remains associated with the file or can be stored in any other way but remaining associated with the file.

The above embodiments have been described with reference to an application making an application-level access request. It will be appreciated that embodiments can be applied to requests from other executable entities such as, for example, programs or any other entity that may require access to data stored on persistent storage or any other type of storage, persistent or otherwise. Such other entities might be at least one of, for example, an operating system entity or any other executable entity.

It will be appreciated that the nonvolatile storage such as, for example, the HDD described above is merely one embodiment of persistent storage or a persistent storage medium and that other storage can be used.

The above embodiments have made reference to using access patterns in determining which data to prefetch. One skilled in the art appreciates that such access patterns can be created in advance using, for example, software that is designed to discern such access patterns from actual disc usages and that embodiments are not limited to the access patterns described herein.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings) and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. A data processing system comprising:
a first interface to receive a data access request from an application and a second interface for performing an operation in relation to a data stored using persistent storage, and
a prefetcher to read metadata associated with a file containing data to be retrieved based on the data access request;
to select at least one access pattern associated with a request for data from the storage; and
to use the metadata in identifying further data to be prefetched and placed in storage or memory having a performance that is greater than the performance of the persistent storage.

2. A data processing system as claimed in claim 1 in which the metadata comprises data to identify, or associated with, at least one access pattern for the data.

3. A data processing system as claimed in claim 2 in which the metadata comprises data to identify, or associated with, a plurality of access patterns.

4. A data processing system as claimed in claim 1 further comprising a correlator to determine a least one degree of similarity between the metadata and historical data access.

5. A data processing system as claimed in claim 4 comprising a selector to select at least one or some of the metadata for use in prefetching the further data according to the at least one determined degree of similarity.

6. A data processing system as claimed in claim 1 in which the metadata comprises data identifying, or associated with, at least one of a sequential, a looping, a temporally-clustered or a probabilistic access pattern.

7. A data processing system as claimed in claim 1 in which the metadata is stored within a predetermined data structure.

8. A data processing system as claimed in claim 7 in which the predetermined data structure is a unique identifier data structure.

9. A data processing system as claimed in claim 7 in which the data structure is an inode.

10. A data processing system to prefetch data from storage in advance of an executable entity requesting the data, the system comprising:
means to select at least one access pattern associated with a request for data from the storage, based on metadata stored in a table,
means to prefetch further data from the storage according to a selected access pattern, and
means to store the further data in the storage and having a performance that is greater than the performance of the persistent storage.

11. A data processing method to retrieve data from storage in response to a program requesting first data; the method comprising the steps of:
processing, by a computer, metadata associated with the first data to identify data to be retrieved from the storage;
retrieving, by the computer, the identified data from the storage; and
using, by the computer, the metadata in identifying further data to be prefetched and placed in another storage or memory having a performance that is greater than the performance of the storage.

12. A method to prefetch data from storage, the method being performed by a computer and comprising the steps of:
receiving a request to access a file from an application;
processing the request to identify a unit of data associated with the request;
processing metadata associated with the request to access the file to identify at least one further unit of data;
retrieving at least one of the unit of data associated with the request and the at least one further unit of data from the storage;
servicing the request to access the file by forwarding at least a portion of the unit of data associated with the request to the application; and
storing at least a portion of the at least one further unit of data in a memory.

13. A computer readable storage medium storing a program comprising computer executable code to process a data access request from an executable entity to select at least one access pattern associated with a request for data from the storage and to perform an operation in relation to data stored using a storage medium, and computer executable code to read metadata associated with the stored data and to use the metadata to identify further data to be prefetched and stored using further storage having a performance that is better than the performance of the storage medium.

14. A program comprising code to implement a system or method as claimed in claim 1.

15. Computer readable storage storing a computer program as claimed in claim 13.

16. A data processing system as claimed in claim 1, further comprising:
   an inode table that stores the metadata associated with the file and with other files.

17. A data processing system as claimed in claim 16, wherein the metadata stored in the inode table comprises:
   Unix file system context information;
   device identifier information for identifying a device holding the file;
   an inode number;
   a mode indication indicating what the inode represents as well as associated access rights; and
   use identifiers.

18. A data processing system as claimed in claim 17, wherein the metadata stored in the inode table further comprises:
   a times field identifying creation, modification and write times associated with the file;
   an inode operations field containing a pointer to a block of routine addresses that are specific to an underlying file system and which perform operations in relation to the inode;
   a count field providing an indication of a number of system components currently using the inode;
   a lock field that is used to lock the inode when the inode is being read by the underlying file system; and
   a dirty field that provides an indication that the inode has been written to and that the underlying file system needs to modify.

19. A data processing system as claimed in claim 1, wherein the prefetcher also receives information regarding an amount of free memory within a cache memory in determining what if any data placed to place in the storage or the memory having the performance that is greater than the performance of the persistent storage.

\* \* \* \* \*

UNITED STATES PATENT AND TRADEMARK OFFICE
CERTIFICATE OF CORRECTION

PATENT NO.        : 7,937,404 B2                                    Page 1 of 1
APPLICATION NO.   : 11/883231
DATED             : May 3, 2011
INVENTOR(S)       : Shailendra Tripathi It is certified that error appears in the above-identified patent and that said Letters Patent is hereby corrected as shown below:

In column 8, Claim 13, line 62, delete "entity" and insert -- entity; --, therefor.

Signed and Sealed this
Fifteenth Day of November, 2011

David J. Kappos
*Director of the United States Patent and Trademark Office*